United States Patent [19]
Ward

[11] Patent Number: 5,244,221
[45] Date of Patent: Sep. 14, 1993

[54] MULTI-USE HAND TRUCK

[76] Inventor: John S. Ward, 1117 Waterford Pl., Herndon, Va. 22070

[21] Appl. No.: 944,225

[22] Filed: Sep. 14, 1992

[51] Int. Cl.⁵ .......................... B62B 3/02; B62B 3/04; B62B 3/10
[52] U.S. Cl. ................................ 280/79.7; 280/47.2; 280/47.28; 280/47.35; 414/446; 414/490; 269/17; 269/905
[58] Field of Search ................ 280/79.7, 47.16, 47.19, 280/47.2, 47.27, 47.28, 47.35, 33.994, 47.34; 414/444, 446, 490; 269/17, 905

[56] References Cited

U.S. PATENT DOCUMENTS

| | | | |
|---|---|---|---|
| 137,086 | 3/1873 | La Tourette | 280/47.27 |
| 2,503,388 | 4/1950 | Hedlund | 269/905 X |
| 2,808,157 | 10/1957 | Terrill | 280/47.34 X |
| 2,812,190 | 11/1957 | Clifton | 414/446 X |
| 2,818,988 | 1/1958 | Dunkin | 280/47.2 X |
| 3,104,890 | 9/1963 | Hill | 280/47.27 X |
| 3,272,527 | 9/1966 | Martin | 280/33.994 |
| 3,512,755 | 5/1970 | Donakowski | 414/446 X |
| 4,050,671 | 9/1977 | Coleman | 269/17 X |
| 4,138,099 | 2/1979 | Englehart | 269/17 |
| 4,398,768 | 8/1983 | Parks et al. | 280/47.16 X |
| 4,752,173 | 6/1988 | Fleming | 414/10 |
| 4,867,465 | 9/1989 | Dunchock | 280/79.7 X |
| 4,978,132 | 12/1990 | Wilson et al. | 280/79.7 X |
| 5,037,117 | 8/1991 | Hershberger | 280/79.7 |
| 5,040,265 | 8/1991 | France et al. | 280/33.994 X |

FOREIGN PATENT DOCUMENTS 2437175  2/1976  Fed. Rep. of Germany ...... 269/905

Primary Examiner—Brian Johnson
Attorney, Agent, or Firm—Cornelius J. Husar

[57] ABSTRACT

A multi-use hand truck or dolly apparatus and more particularly, a hand truck useable in the commercial building construction industry. It is capable of being used in both a vertical mode as well as a horizontal mode. When used in its vertical mode, it is capable of carrying up to five doors or other large objects. When used in its horizontal mode, it serves as a sturdy planar work support surface and permits a workman to perform required tasks thereon. Additonally, the apparatus can be joined with another like apparatus and present a much larger horizontal planar work surface. The apparatus includes telescopic frame members which permit accommodation of various length loads. Further, a plurality of swivel casters are provided which allow full rotational movement of the apparatus when used in its horizontal mode.

20 Claims, 4 Drawing Sheets

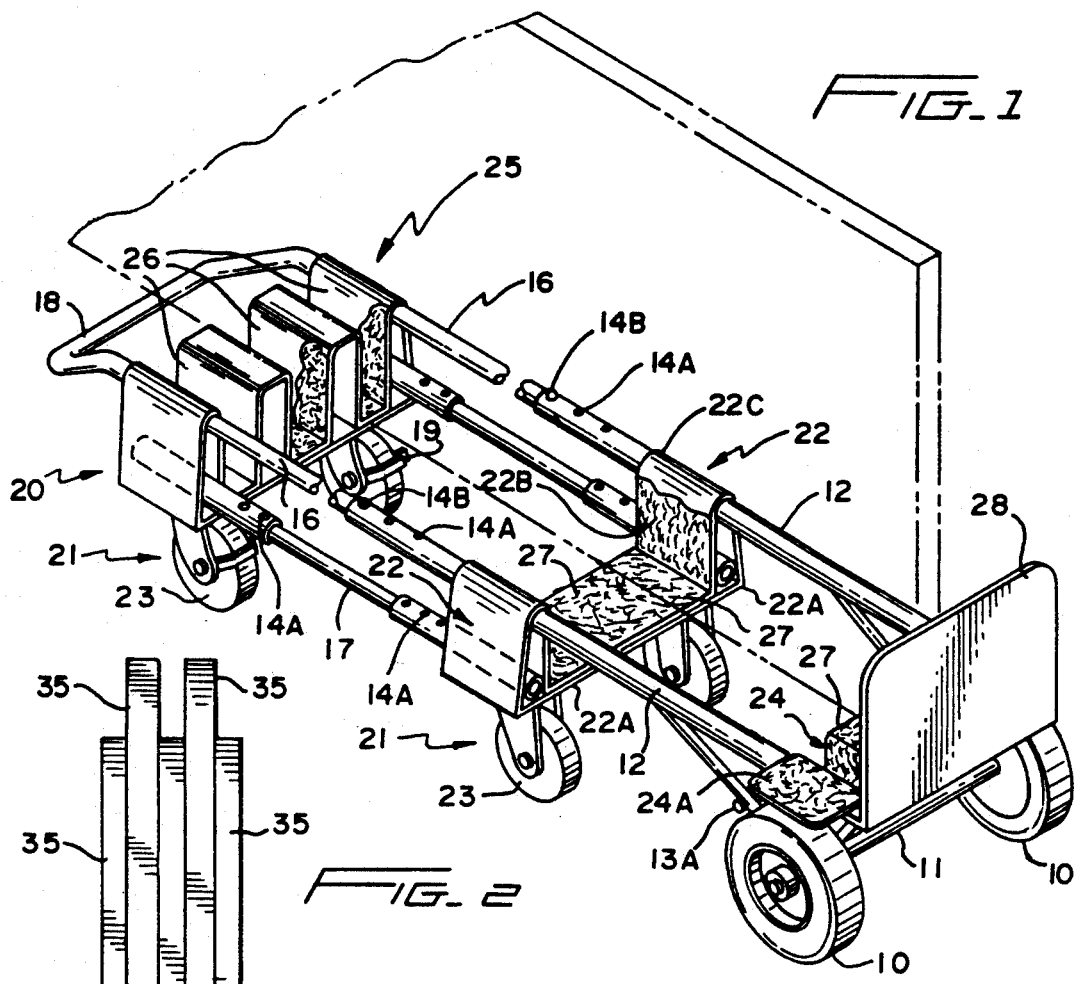
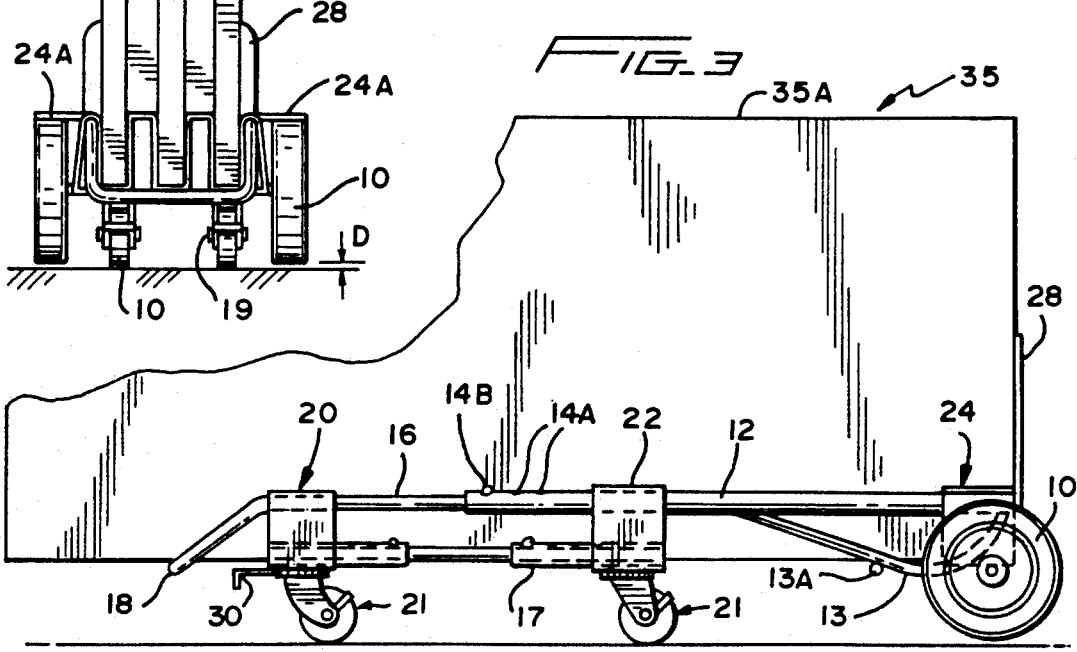

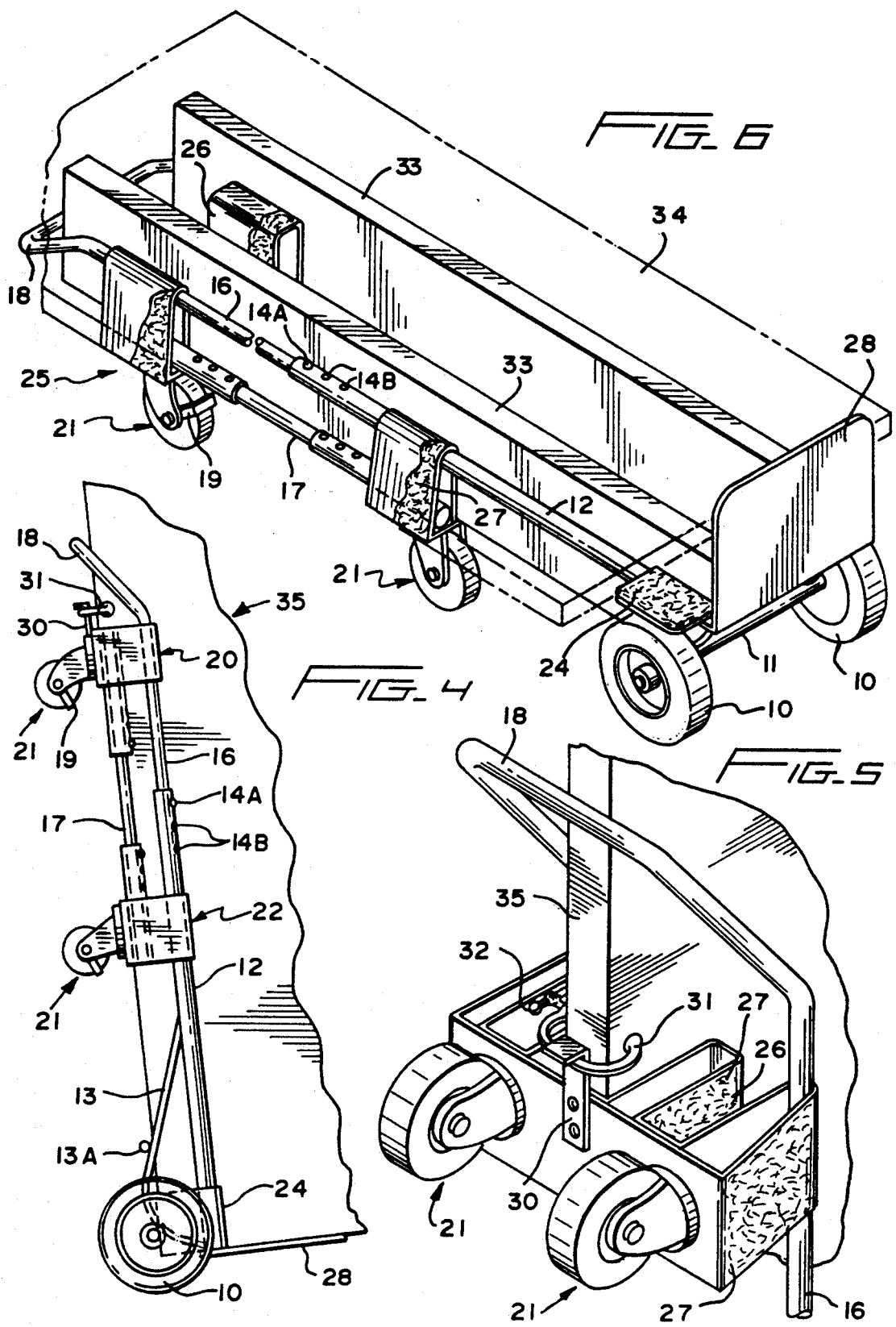

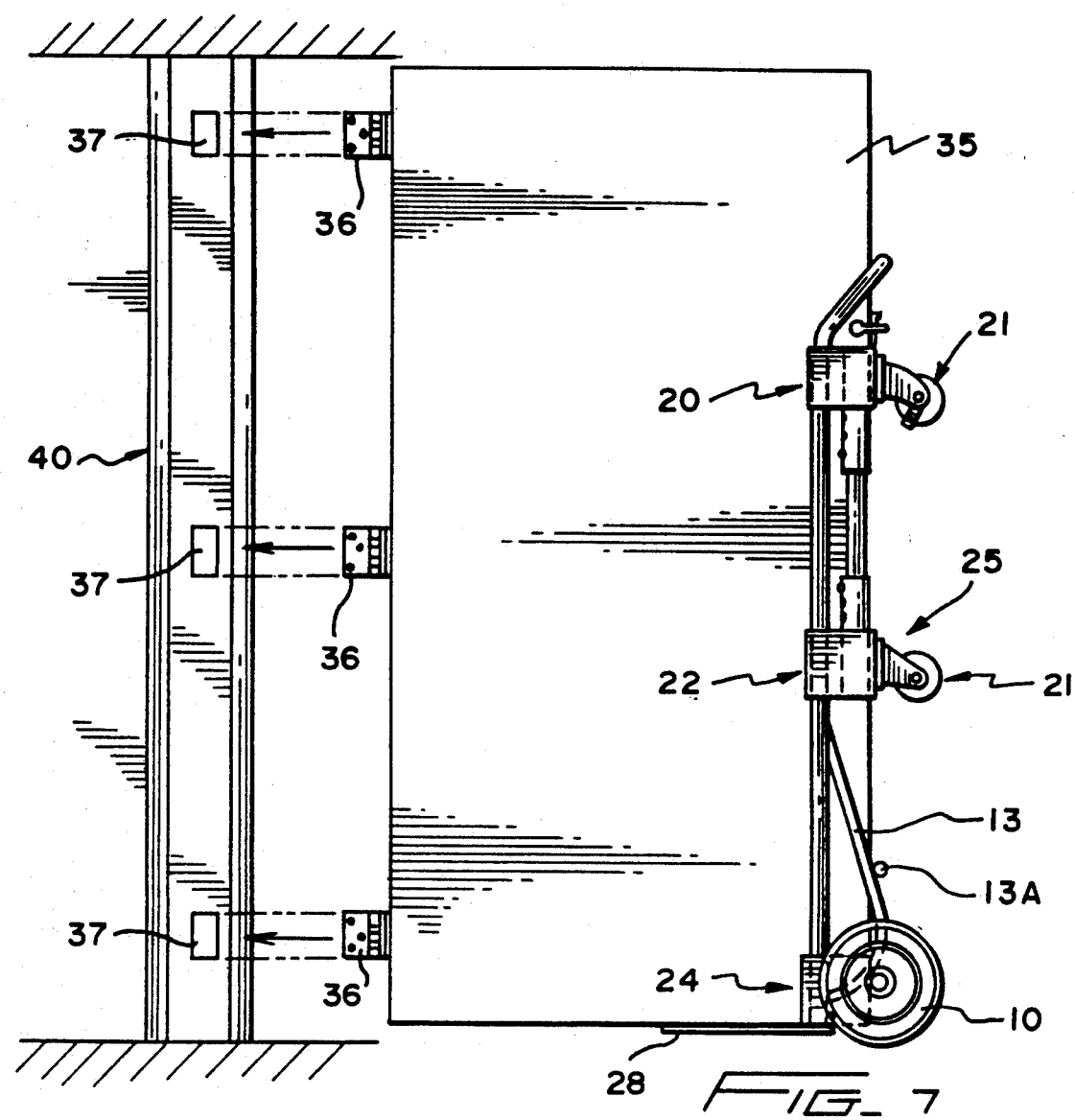
FIG_7
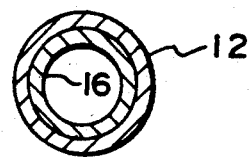
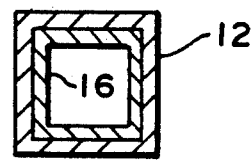
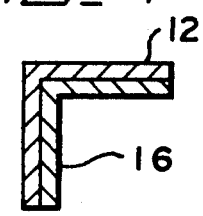
FIG_8A  FIG_8B  FIG_8C
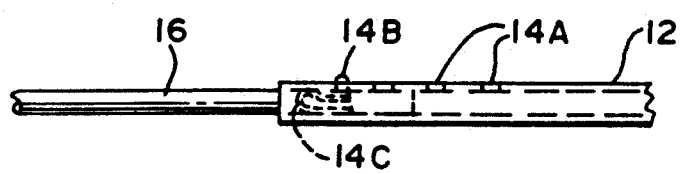
FIG_9

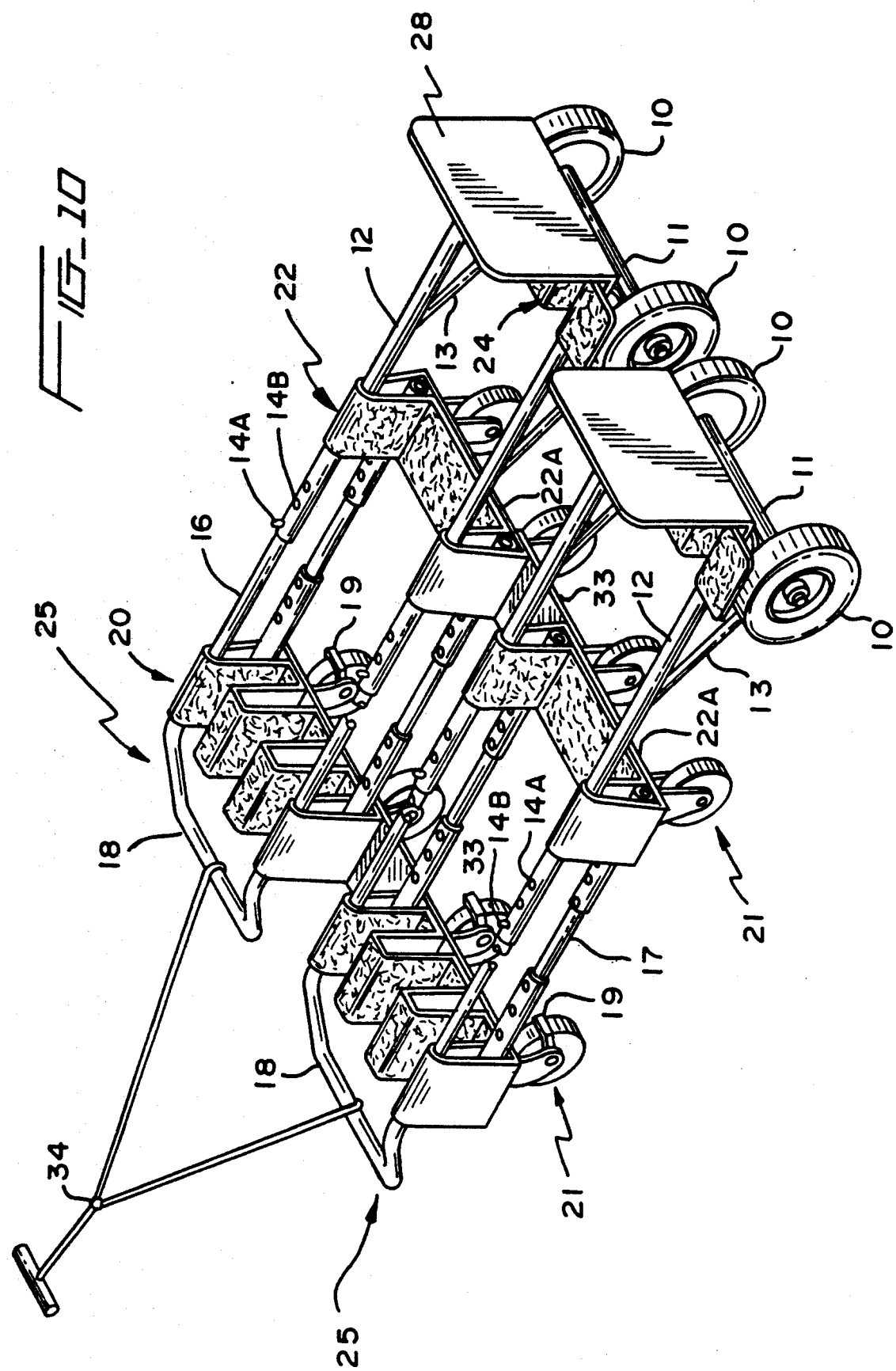

MULTI-USE HAND TRUCK

TECHNICAL FIELD

This invention relates to a multi-use hand truck or dolly apparatus and more particularly, relates to a hand truck useable in commercial building construction and when used in a horizontal position, the hand truck provides a stable transport and supporting apparatus whereby multiple doors can be carried about and hinges or other hardware can readily be mounted on doors then subsequently be used to provide an assist to the workman when hanging the door. Additionally, when not used for transporting or hanging doors, it can readily be converted to a mobile planar work surface allowing a workman to place his tools, saw, or the like thereon or as a cart for carrying cabinets, heavy door hardware and other construction materials thereon.

BACKGROUND OF THE INVENTION

In view of the present state of the economy and the down sizing of the construction industry and the increased competition for the relatively few construction jobs presently available, there is a constant search for ways to reduce the overall construction costs whether it be by the use of improved tools or new solutions to a problem which requires fewer manhours to perform a particular task or a series of tasks which will permit a reduction in the overall bid price.

In the construction of commercial office buildings, it is frequently required that the doors specified in the job specifications are made of solid wood or hollow metal construction and frequently of a thirty-six inch width and sometimes larger widths where the doors are used as an entrance to a library, foyer, conference room, tenant suites, or the like. As one can readily appreciate, a door of this size, made of solid wood construction is very heavy, somewhere in the order of one hundred twenty five pounds. The usual practice in installing doors of this size and construction is for the workman to take a single door from a remote storage area and hand carry it to the location where it is to be installed and then, using a make-shift door stand, proceed to install the hinges and or hardware on the door. Then with the assistance of another workman, finalize the door mounting process by securing the free hinge-half to the door jamb.

With applicant's novel multi-use hand truck, a workman without assistance can carry up to five doors when the apparatus is used in its horizontal position as a transport apparatus. When used for installing hinges and hanging doors only three doors are placed thereon at the stack and hinges are installed on all three doors at that location. When the workman reaches the site where the first door is to be installed, he merely rolls a door off and proceeds to the next closest door location and rolls off another door and continues in this fashion until he gets to the last and most distant location where a door is to be installed. With only one door remaining on the hand truck, the workman merely grabs hold of an upper edge of the door and raises the upper end of the truck with the door thereon and maneuvers the truck into position until the hinhes are in alignment with the routed portions on the door jamb. When raised to its aligned vertical position, the workman merely slides the door horizontally off the hand truck to bring the hinges into alignment with the routed portions and then inserts the required number of screws into the door jamb to complete the mounting of the door to the door jamb. If during the alignment process, the door is too high relative to the routed door frame, the workman merely steps on the base plate to lower the door and bring it into alignment.

Another feature of applicant's apparatus includes a means of clamping an individual door to the frame of the hand truck which allows the workman to raise the truck and its door load from a horizontal position to the vertical position permitting ready maneuverability of the truck and door in preparation for hanging of the door.

A further feature of the applicant's novel multi-use hand truck is the ability to use the apparatus as a mobile horizontal worksurface which allows a construction workman to place construction supplies, cabinets, heavy door hardware and/or other boxed materials thereon. This conversion is accomplished by inserting a pair of two by eight inch boards into the two outermost pockets which are otherwise used as door supports and then placing a sheet of one half inch plywood thereover to provide the work surface. Swivel casters are attached to the base plate of the door support members and positioned such that when all four casters are in engagement with the floor, the two, larger diameter, non-swivel type, truck wheels are raised approximately one quarter of an inch off the floor. With this arrangement, the workman can readily rotate the entire truck including the tools and/or supplies thereon about the center thereof to provide ready access to the opposite side. It is also to be noted that each of the swivel casters are capable of supporting two hundred fifty pounds permitting a total load of one thousand pounds. However, only two of the swivel casters need be provided with locking wheels to prevent rolling when used in this manner. Also, the one half inch plywood surface may be secured to the two undersupports by screws, nails or the like.

Another feature of the novel multi-use hand truck is the use of connector plates which permit a second identical hand truck to be attached to the first hand truck. Such a feature would most likely be used when the apparatus is used in the planar surface mode and the door carrying mode, when you are carrying doors through double door areas.

OBJECTS OF THE INVENTION

An object of the invention is to provide an apparatus which finds utility in the commercial construction industry.

Another object of the invention is to provide a multi-use hand truck for simultaneously carrying a plurality of doors.

A further object of the invention is to provide an apparatus which when lowered to its horizontal position also serves as the supporting surface when mounting hardware to the door.

A still further object of the invention is to provide an apparatus which is useful to assist the workman in hanging a door after the hinges have been installed.

Yet another object of the invention is to provide an apparatus which is convertible to a mobile planar work surface.

Another object of the invention is to provide an apparatus which is extendible to accommodate loads of varying lengths.

A still further object of the invention is to provide an apparatus which includes a plurality of swivel casters which when brought into engagement with a floor raises the transport wheels off the floor, thus allowing rotative movement of the unit.

Yet another object of the invention is to provide an apparatus having swivel casters with locking means to prevent unwanted movement.

Another object of the invention is to provide a means whereby a door is lowered to its proper elevation for easy installation without the need of any jacking devices as found in the prior art.

Another object of the invention is to provide an apparatus wherein the door supporting pockets include a protective covering to prevent damage to the doors by scratching.

Yet another object of the invention is to provide an apparatus which includes connecting plates to permit plural units to be operably connected to each other.

These and other objects of the invention will become more apparent hereinafter. The instant invention will now be described with particular reference to the accompanying drawings which form a part of this specification wherein like reference characters designate the corresponding parts in the several views.

BRIEF DESCRIPTION OF THE DRAWINGS

FIG. 1 is a perspective view of the novel multi-use hand truck in a horizontal position with a single door thereon.

FIG. 2 is an end view of the multi-use hand truck with five doors positioned thereon in the transport position.

FIG. 3 is a side view illustration of the multi-use hand truck with a door thereon.

FIG. 4 is an illustration of the multi-use hand truck in preparation of its final maneuvering position of the door and hinges relative to the door frame.

FIG. 5 is an enlarged view illustrating the upper portion of the multi-use hand truck with the clamping means for securing the door to the frame of the hand truck.

FIG. 6 is a perspective illustration of the multi-use hand truck when used in its planar work surface mode.

FIG. 7 is an illustration of the manner in which the level hand truck is used in hanging a door to its frame.

FIGS. 8A, 8B, and 8C is an illustration of the various configuration which may be utilized in making the frame of the hand truck.

FIG. 9 is an illustration of the spring loaded detent for providing longitudinal adjustment of the hand truck.

FIG. 10 is a perspective view, illustrating the manner by which several hand truck units may be ganged together to form a larger work surface.

DETAILED DESCRIPTION OF THE DRAWINGS

Referring now to FIGS. 1 and 7, there is shown a perspective view of the multi-use hand truck, shown generally by reference numeral 25, wherein a door 35 is shown, in phantom lines, resting on truck 25, in preparation for hinge mounting. As illustrated in FIG. 1, hand truck 25 includes a pair of transport wheels 10 which are rotatably mounted on axle 11. Connected to axle 11 are a pair of spaced first tubular frame members 12 which are supported by a pair of diagonal brace members 13. Connected to brace members 13 is horizontal foot rest 13A which is used to lower the hand truck 25 from its vertical to its horizontal position. First tubular frame members 12 telescopically receive second tubular frame members 16 which are interconnected by horizontal handle member 18. A pair of longitudinal supports 17 extend from the base of door support members 20 to door support members 22. These longitudinal support members 17 are telescopic and provided with a plurality of holes 14A for receiving a hair pin clip, cotter pin or bolt to lock the desired length position. Handle member 18 is bent downwardly at a slight angle to provide a comfortable grasping position for the user.

Permanently secured to first tubular frame members 12, second tubular frame members 16 and axle 11 are three door support members 20, 22 and 24, respectively. As illustrated, uppermost door support member 20 provides three door receiving pockets 26, each of which receives the edge of a door 35. It is to be noted that the uppermost ends of pockets 26 terminates at a plane coincident with frame members 12 and 16. Door support members 20, and 24 can be formed of one-fourth or one eighth inch aluminum, steel or stainless steel plate and bent into three channel-like configurations to form door receiving pockets 26 with a base plate of equal thickness thereunder. As a means of protecting the wooden doors from damage while on hand truck 25, a soft rug-like or felt protective material 27 is placed over all the door engaging surfaces which come into contact with door 35. However, in the drawings, door support members 20, 22 and 24 are shown only partially covered to permit a better view of the support members. The width of pockets 26 is only slightly larger than the thickness of a door to provide a firm support to the doors when positioned therein. As illustrated, upper door support member 20 in fixedly mounted to first tubular members 16. The attachment means can be brazing, bolts or other like means. Attached to the underside of upper door support member 20 are a pair of swivel casters 21 which include a latch member 19 for locking swivel wheel 23 and preventing rotation thereof when desired. If necessary, shims may be utilized between the bottom plates of door support members 20, 22 and the mounting plate of swivel casters 23 to insure that the effective height of swivel casters 23 is sufficient to raise transport wheels 10 approximately one quarter inch off the floor when the hand truck is placed in its horizontal position.

Middle door support member 22 is of a slightly different configuration from upper door support member 20. As shown, middle support member 22 comprises a base portion 22A which extends outwardly from the center and is then bent upward to form left and right generally triangular portions 22B with the apex rounded at 22C. The inner radius of rounded apex 22C conforms to the outside diameter of first tubular member 12 to permit supporting contact therealong. Middle support member 22 is secured to first tubular member 12 by welding, brazing or suitable fastening means. It should be noted that middle door support 22 does not have the two additional inner pockets 26 as does upper and lower door supports 20 and 24. It is this middle support member 22 that serves as the main frame brace that prevents the frame from racking. However, middle door support 22 is provided with protective material 27 over upper horizontal plate 22D and triangular portions 22B. A pair of spaced non-locking swivel casters 21 are secured to the underside of base portion 22A.

Lower door support 24 is positioned over axle 11 and fixedly secured thereto. Lower door support 24 is provided with three door receiving pockets 26 similar to that shown by upper door support 20. The outermost portions of lower door support 24 terminate in two oppositely disposed horizontal flange extensions 24A which extend over transport wheels 10. Attached to the lowermost portion of hand truck 25 is base plate 28 which is used to provide height adjustment of the doors when mating the hinges with the door jamb as will be explained later with reference to other figures.

Also shown in FIG. 1, is the means by which lengthwise adjustment of hand truck 25 can be accomplished. As indicated, first tubular members 12 are each provided with a plurality of longitudinally spaced holes 14A through which a quick release pin 14B, bolt, or hair pin may be inserted to provide the desired length. Quick release pins 14B are conventional and per se, are not considered to be part of the invention described herein.

Turning now to FIG. 2 there is shown the multi-use hand truck 25 in its horizontal position fully loaded with five doors 35 as used in transporting the doors 35 from a delivery truck to storage stacking or from storage to door installation. It is to be noted again that when in the horizontal position as shown, transport wheels 10 are raised the distance "D" which is approximately one-fourth inch off the floor to permit full 360 degree rotation of hand truck 25 as desired.

FIG. 3 is a side view of multi-use hand truck 25 with a single door 35 positioned thereon in the horizontal position whereby upper edge 35A is conveniently exposed permitting the workman to proceed with the hinge installation process. Although only one door 35 is shown, three doors 35 may be hinged at one time. Again, transport wheel 10 is shown slightly off the floor by approximately one-quarter inch.

FIG. 4 is an illustration of the multi-use hand truck 25 in its vertical transport position for final installation. As shown therein, clamp bracket 30 extends from the underside of upper door support 20 to provide an attachment point for C-clamp 31 which provides a solid connection between door 35 and hand truck 25 and allows raising of the entire assembly from a horizontal position to the illustrated vertical position merely by grabbing an upper edge of door 35.

FIG. 5 is an enlarged view of the uppermost end of multi-use hand truck 25 allowing a better view of C-clamp 31 and its attachment to clamp bracket 30 and engagement with door 35. Securement of C-clamp 31 is effected by turning handle 32 in the appropriate direction. Although a C-clamp 31 is illustrated as the securement means, other optional clamping devices may used.

Turning now to FIG. 6, there is shown multi-use hand truck 25 as it appears when used in its planar worksurface mode. As shown therein a pair of two-inch by eight-inch boards 33 of appropriate length have been placed in pockets 26 to provide a longitudinal support for planar worksurface 34 which is illustrated in phantom. Planar worksurface 34 is secured to boards 33 by any convenient means such as screws, nails or the like. In this mode, multi-use hand truck 25 is readily converted to a worksurface which can accommodate workman tools or other construction materials such as cabinets, heavy door hardware and other boxed materials and provide mobility about the construction site.

Referring now to FIG. 7, there is shown an illustration of how the subject hand truck is used to maneuver door 35 into position for its securement to door frame 40. As illustrated, hinges 36 have been fastened to door 35. Door frame 40 has been routed at 37 to receive the free half of hinge 36. When door 35 is properly aligned with door frame 40 screws are installed through the holes in hinges 36 into door frame 40 for securing door 35 thereto.

FIGS. 8A, 8B, and 8C are an illustration of the various types of frame members which can be utilized. The circular configuration represents the type used throughout the drawings. However, telescopic hollow square members or L-shaped angle iron members may alternatively be used. The type of frame members utilized is controlled in large measure, by the use to which the novel hand truck will be put to. Since each of the swivel casters is capable of supporting two hundred and fifty pounds a total of one thousand pounds can be supported thereon. It is to be noted that swivel casters 23 are located very near to the vertical centerline of outer pockets 26 of door supporting members 20 and 24 thus ensuring that the load will be supported thereon.

FIG. 9 is an illustration of the adjustment means utilized for adjusting the overall length of hand truck 25. As illustrated, a spring loaded detent 14B projects through a selected hole 14A in first tubular member 12. As illustrated in broken lines the inner end of detent 14B is fastened to U-shaped spring member 14C and provides the outward bias on detent 14B. Merely depressing detent 14B and then pushing inward on members 12 and 16 and then releasing detent 14B when it is aligned with the desired hole 14A provides the lengthwise adjustment. In lieu of spring loaded detent 14B other securement means such as a cotter pin, hair pin or bolt may be used.

FIG. 10 is a perspective view wherein two hand trucks 25 have been mated or coupled through the use of connector plates 33 to provide a single, larger, mobile planar supporting surface. Once connected together, a conventional handle 34 can be used to guide the planar work surface from one place to another. As shown, the coupled units may carry ten doors or else used in its planar worksurface mode by placing two inch by six inch boards in pockets 26 and then placing sheeting thereover to provide a support surface.

Although applicant's novel hand truck can be used as a mobile transporting cart with a planar support surface as well as an apparatus for transporting multiple doors (up to five)to a desired location. The most useful application that this apparatus can be used for is the transporting, hinging and hanging of doors by a workman without the need for assistance. Although five doors can be carried simultaneously on a single hand truck 25, only three doors can be hinged sequentially on the apparatus. It is believed that a review of the procedure for transporting, hinging and hanging doors with the novel apparatus would be useful to provide a complete understanding of the apparatus.

With applicant's novel multi-use truck, a workman without assistance, can carry up to five doors from the delivery truck to the storage stacking area, through as little as a two foot door opening, on a level or flat surface in the horizontal hand truck position.

In the installation of hinges to the doors, a first door is loaded onto the apparatus by sliding the first door onto the apparatus in the vertical position between the center pockets on the upper and lower door support members. By installing a C-clamp 31 or other clamping device around the hook 30 to the door, as shown in FIG. 4, now hand truck apparatus 25 can be lowered to the horizontal position by grasping the upper edge of door 35. In the horizontal position, another door can be rolled into each of the other two outside pockets, remembering that the center door is opposite the two outside doors. The hand truck is now in the door stand or support position. One workman can now hinge these three doors one at a time.

After hinging all three doors, the doors can now be transported to the proper location of installation with the hand truck 25 in the horizontal position.

The above description is considered to be beneficial to a workman in understanding the full potential of applicant's novel hand truck. As can be seen from the above, the novel hand truck not only allows a single workman to carry multiple doors from one location to another, but also permits significant savings of man-hours in the installation of hinges and the hinging of doors.

While the invention has been described in its preferred embodiments, it is to be understood that the words which have been used are words of description rather than limitation and that changes may be made without departing from the full scope or spirit of the invention.

Having thus described my invention, I claim:

1. A convertible, multi-use hand truck apparatus for transporting a plurality of generally rectangularly shaped objects and subsequently providing a sturdy workholding apparatus for said objects permitting work to be performed thereon, said apparatus comprising:
   frame means having at least a pair of telescopic members and including a handle at one end thereof and a base plate operably connected to the opposite end thereof;
   said base plate extending the full width of said frame means and extending outwardly therefrom perpendicularly thereto;
   primary transport means secured to the opposite end of said frame means below and slightly forward of said base plate;
   work supporting means including a plurality of pockets fixedly secured to said frame means providing a plurality of work supporting surfaces; said pockets having an upper open portion coincident with the plane of said telescopic members;
   a plurality of secondary omni-directional transport means operably connected beneath selected ones of said plurality of work supporting means whereby after placing said multi-use apparatus in a vertical position, a plurality of rectangular-shaped objects may be loaded onto said multi-use apparatus, transported to a work site and by subsequently lowering said multi-use apparatus into a horizontal position said secondary omni-directional transport means is brought into engagement with the floor and supports the entire load thereon and said primary transport means are raised off the floor permitting work operations to be performed on said rectangularly shaped objects in preparation for mounting said rectangularly shaped objects.

2. A convertible multi-use hand truck apparatus as defined in claim 1 wherein said frame is adjustable and comprises two pairs of telescopic members interconnecting said handle and said base plate at the opposite ends thereof.

3. A convertible multi-use hand truck apparatus as defined in claim 1 wherein said primary transport means includes an axle extending transversely relative to said first telescopic frame members and a pair of wheels operatively connected to opposite ends of said axle.

4. A convertible multi-use hand truck apparatus as defined in claim 2 wherein said adjustable frame means further includes a pair of diagonal bracing members secured at upper ends to a larger of said first telescopic members; said diagonal bracing members including a curved portion which engages said axle and continues back to a lowermost portion of each of said larger first telescopic members thereby providing rigidity and stability to said first telescopic frame members and said axle.

5. A convertible multi-use hand truck apparatus as defined in claim 1 wherein said work supporting means comprises a plurality of work support members extending transverse to said frame means and securely attached thereto.

6. A convertible multi-use hand truck apparatus as defined in claim 5 wherein said plurality of work supporting members is three with the first work supporting member securely attached to the upper portion of said frame means near said handle and is provided with a plurality of door receiving pockets.

7. A convertible multi-use hand truck apparatus as defined in claim 6 wherein the second of said plurality of work supporting members is securely attached to a mid-portion of said frame means and is provided with a flat portion intermediate opposite ends.

8. A convertible multi-use hand truck apparatus as defined in claim 7 wherein the third of said plurality of work supporting members is securely attached to a lowermost end of said frame means and is provided with a plurality of door receiving pockets similar to that of said first work supporting member.

9. A convertible multi-use hand truck apparatus as defined in claim 5 wherein each of said work supporting members is provided with a soft felt-like covering to prevent damage to objects carried thereon.

10. A convertible multi-use hand truck apparatus as defined in claim 1 wherein said omni-directional transport means comprises swivel casters which include locking means on selected ones thereof to prevent undesired movement of the apparatus.

11. A convertible multi-use hand truck apparatus as defined in claim 7 wherein said adjustable frame means includes a second pair of telescopic members which are interconnected with said first and second work supporting members.

12. A convertible multi-use hand truck apparatus as defined in claim 11 wherein each of said second pair of telescopic members comprises a first member connected to said first work supporting member and a second member connected to said work supporting member with a third member adjustably received in each of first and second members, said second pair of telescopic members providing stability and rigidity to the entire hand truck apparatus.

13. A convertible multi-use hand truck apparatus as defined in claim 1 wherein said adjustable frame means is formed of hollow steel which is circular in cross-section.

14. A convertible multi-use hand truck apparatus as defined in claim 1 wherein said frame means is formed of hollow steel which is square in cross-section.

15. A convertible multi-use hand truck apparatus for transporting construction materials comprising:
   frame means including upper frame members and a handle means at one end thereof;
   a plurality of work supporting members positioned at spaced intervals along said frame means with one each positioned at an upper, middle and lower position thereof and securely fastened thereto;

said work supporting members including a plurality of longitudinally planar supporting members which are received in pockets formed in said work supporting members; said pockets having an upper open portion coincident with the plane of said upper frame members;

a planar wooden sheet overlaying said plurality of longitudinal planar supporting members and securely attached thereto;

a plurality of omni-directional transport means securely attached to a base of selected ones of said work supporting members whereby when said convertible multi-use hand truck apparatus is placed in a horizontal position, said truck can be used to transport various construction materials from storage to a point of use.

16. A convertible multi-use hand truck apparatus as defined in claim 15 wherein said frame means comprises a plurality of interengaged telescopic members with locking means for varying the length of said multi-use hand truck apparatus allowing adjustment to a desired length and locked in that position.

17. A convertible multi-use hand truck apparatus a defined in claim 16 wherein said work supporting members includes a plurality of connector plates which are connected with a second set of work supporting members of a second multi-use hand truck apparatus whereby both multi-use hand trucks are ganged together to form a larger transport surface for construction materials.

18. A convertible multi-use hand truck apparatus as defined in claim 15 wherein the number of said plurality of work supporting members is three with said pockets provided in the upper and lower work supporting members while the middle supporting member is provided with a flat portion between opposite ends.

19. A convertible multi-use hand truck apparatus as defined in claim 15 wherein said plurality of omni-directional transport means comprises swivel casters which permit transport and rotative movement of said multi-use hand truck apparatus when used in the horizontal position mode.

20. A convertible multi-use hand truck apparatus as defined in claim 19 wherein selected ones of said swivel casters include locking means thereon to prevent undesired movement of said hand truck apparatus.

* * * * *